United States Patent [19]

Grancoin et al.

[11] 4,363,034

[45] Dec. 7, 1982

[54] VIDEO PICTURE GENERATOR PHOTODETECTOR

[75] Inventors: Bernard Grancoin; Christian Pepin, both of Paris, France

[73] Assignee: Thomson-CSF, Paris, France

[21] Appl. No.: 221,916

[22] Filed: Dec. 31, 1980

[30] Foreign Application Priority Data

Jan. 4, 1980 [FR] France .............................. 80 00170

[51] Int. Cl.³ .............................................. H04N 3/14
[52] U.S. Cl. .................................................... 358/213
[58] Field of Search ............... 358/213, 212, 209, 166, 358/167, 225

[56] References Cited

U.S. PATENT DOCUMENTS 3,904,818 9/1975 Kovac ............................... 358/213
4,010,319 3/1977 Levine ............................... 358/213
4,171,529 10/1979 Silberberg et al. ................. 358/209

*Primary Examiner*—Richard Murray
*Attorney, Agent, or Firm*—Cushman, Darby & Cushman

[57] ABSTRACT

Camera having means for the automatic regulation of the sensitivity of a charge transfer detector functioning by vertical frame transfer. These means comprise a loop for controlling the video signal by varying the integration time of electrons in the image area of the CTD sensor, as well as an optical attenuating device for chopping said area during each period of transferring the collected charges into the store. The attenuator has at least one fixed disk and one movable disk controlled in rotation, the disks carrying optical densities or being made of polarizers.

11 Claims, 24 Drawing Figures

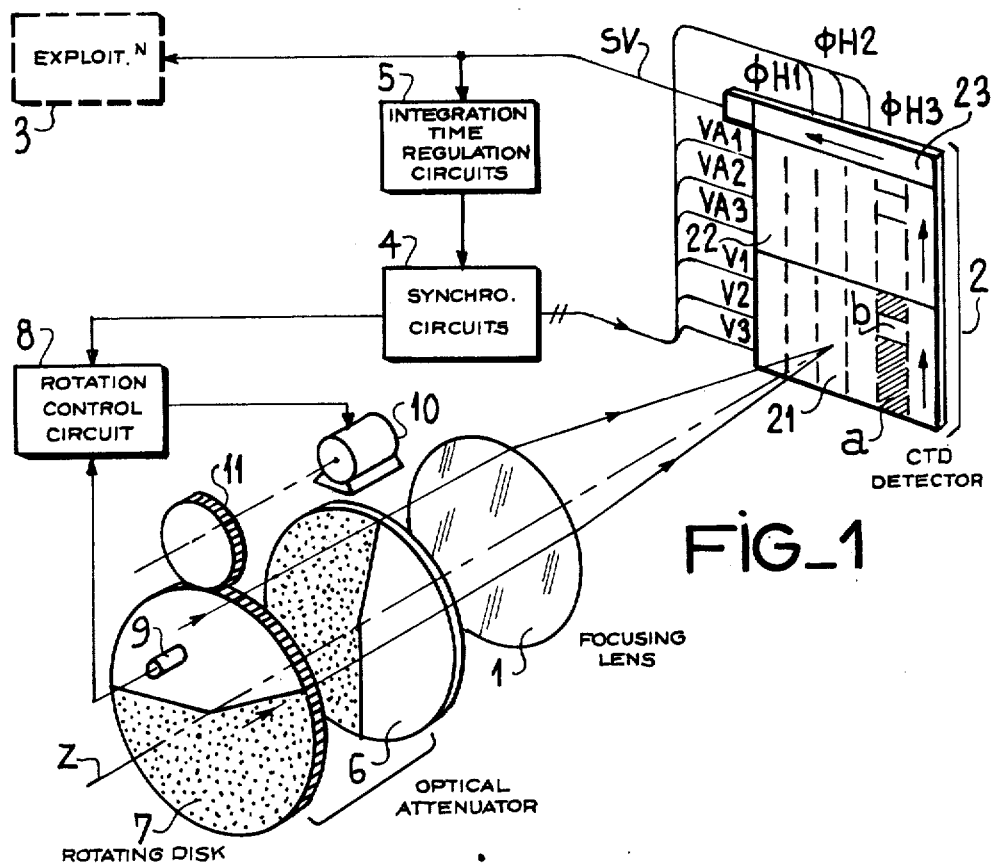
FIG_1
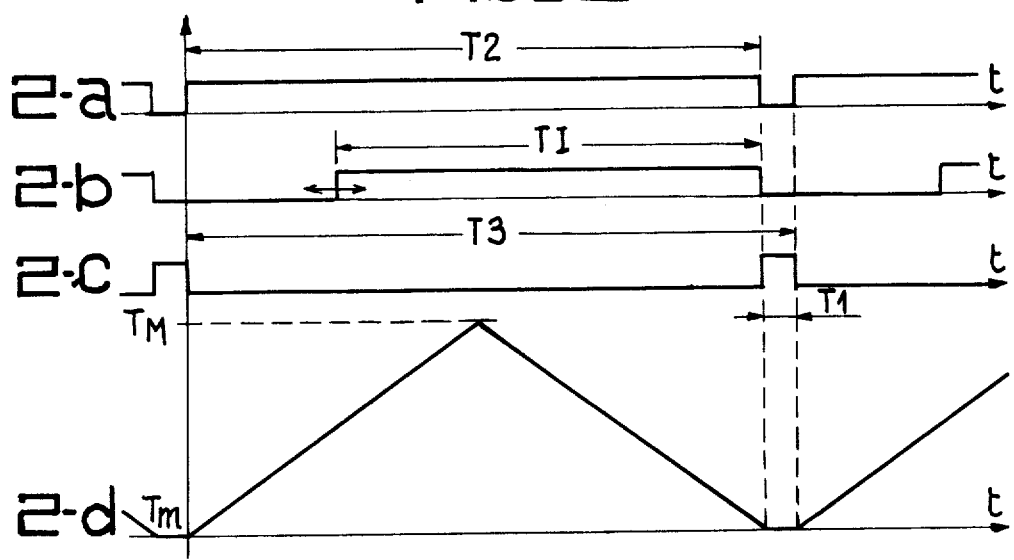
FIG_2

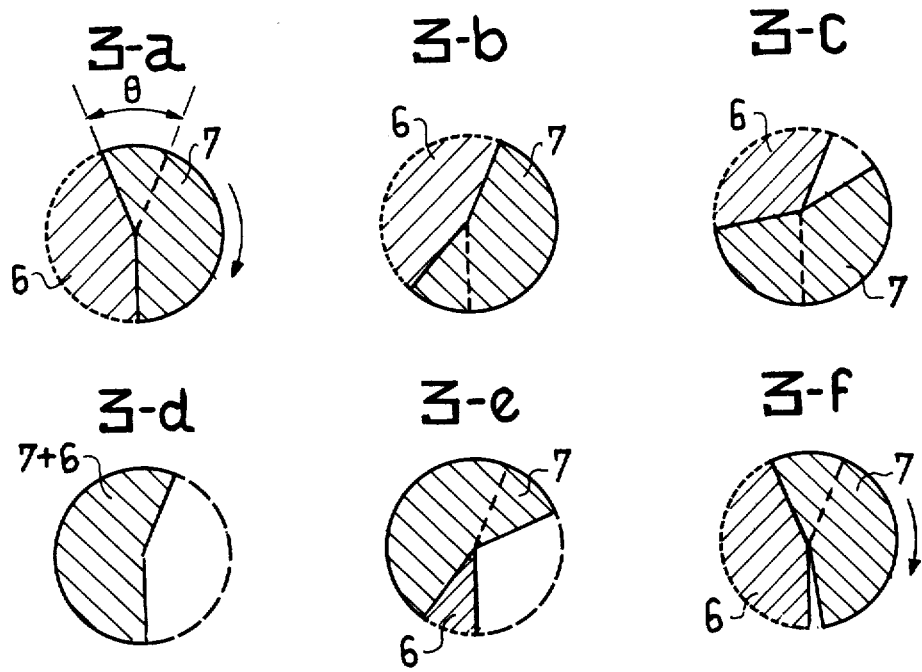
FIG_3
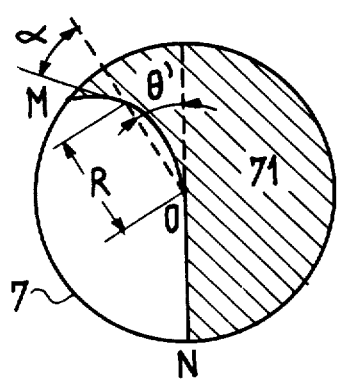
FIG_4
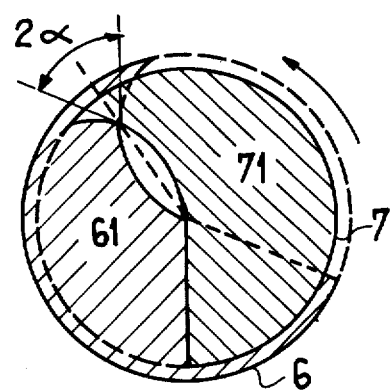
FIG_5

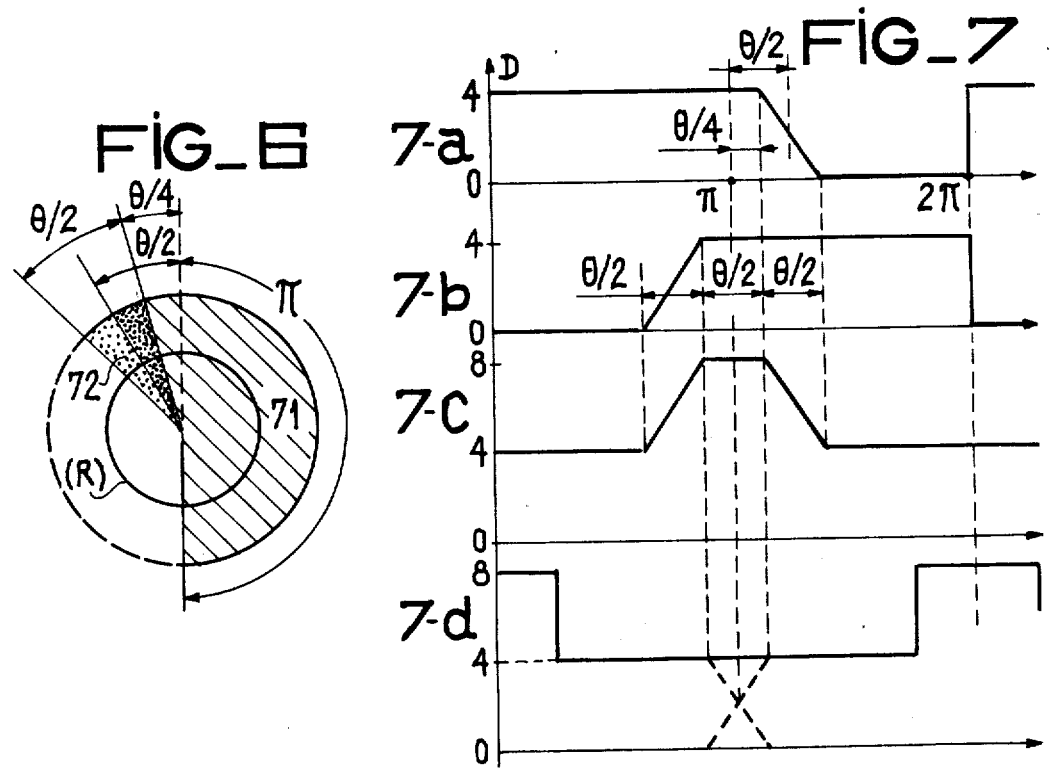
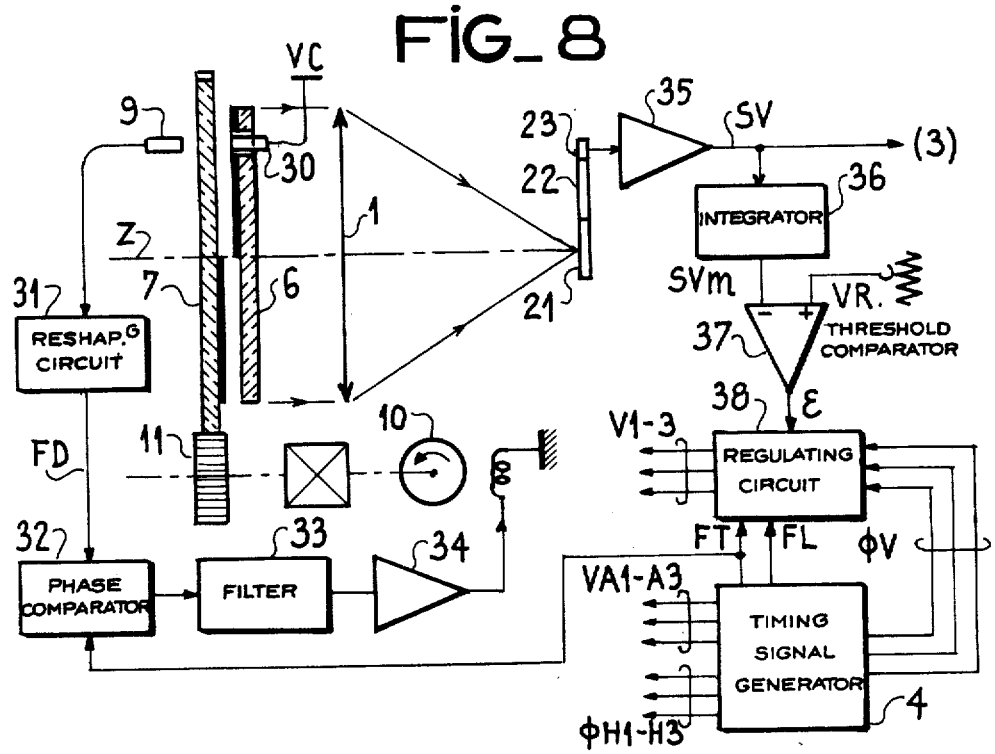

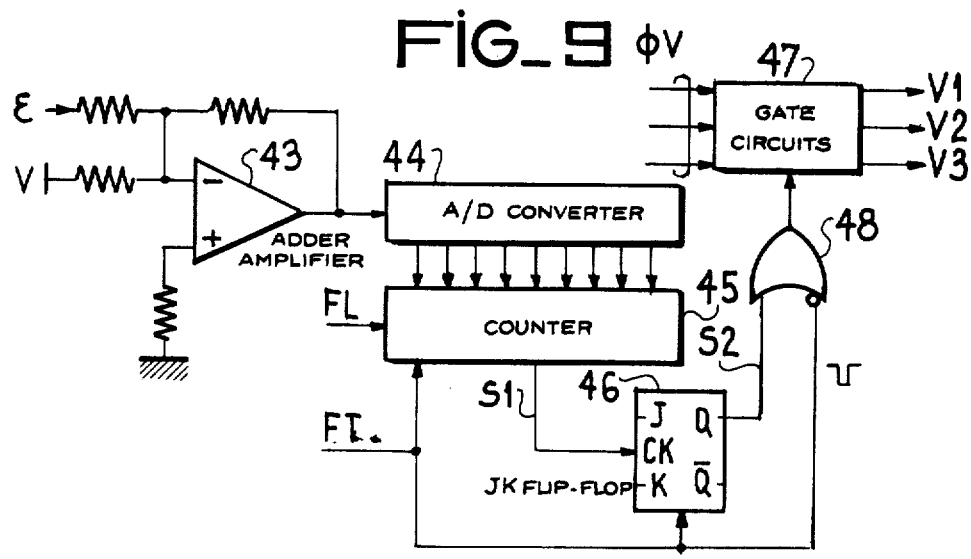
FIG_9
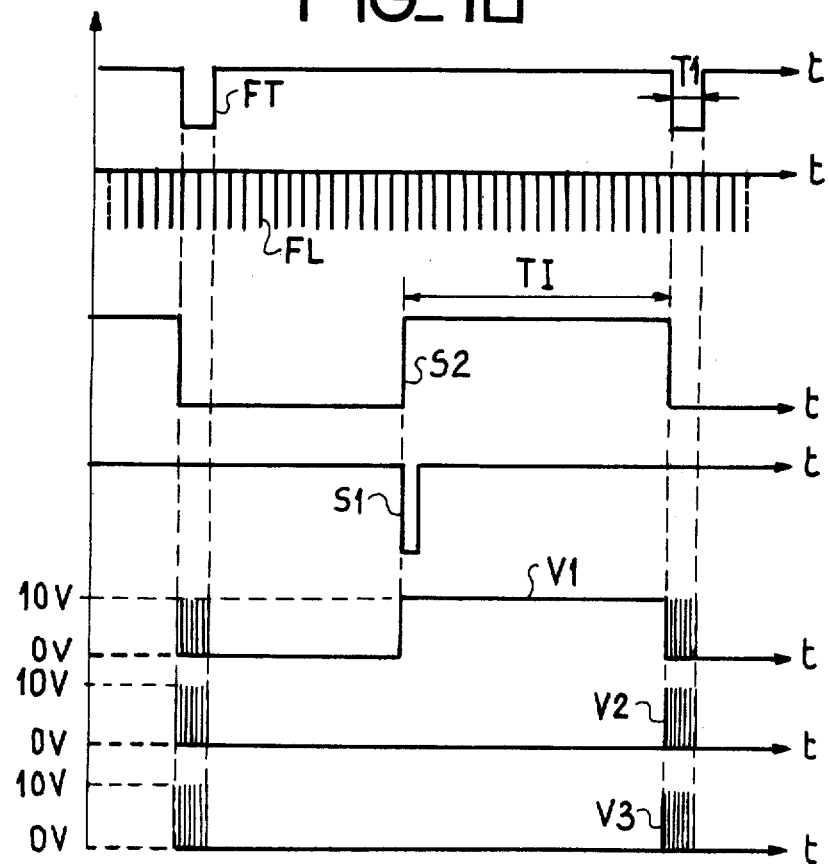
FIG_10

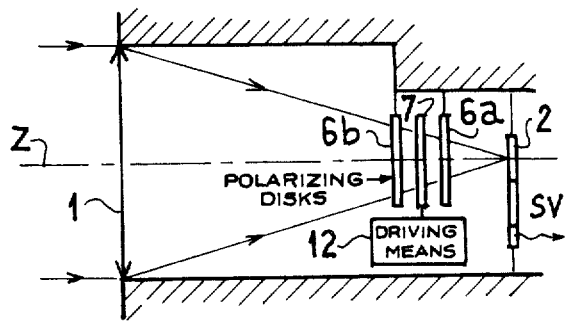
FIG_11
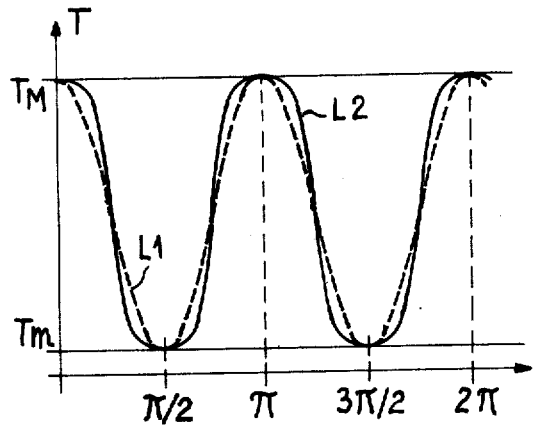
FIG_12
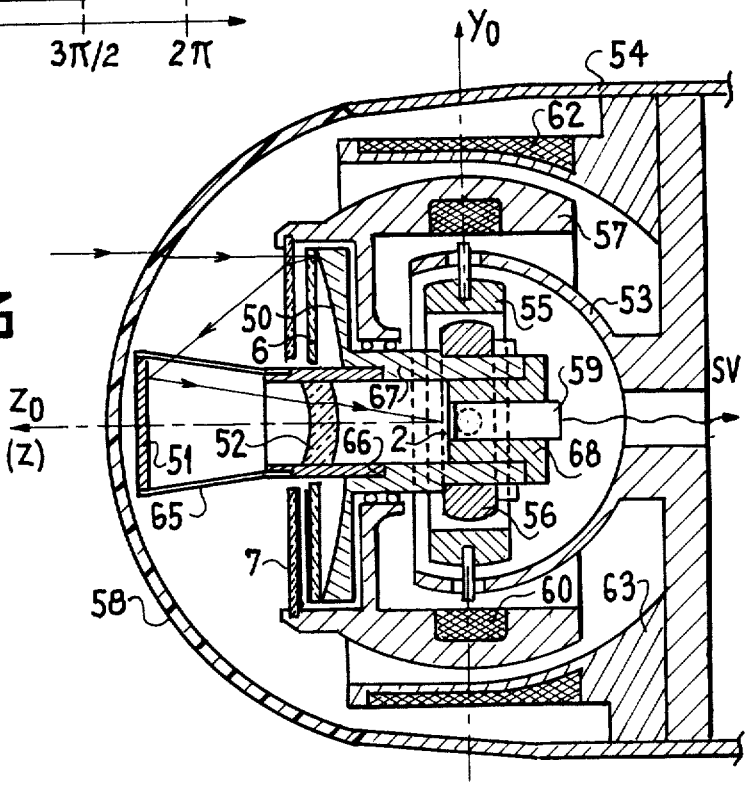
FIG_13

VIDEO PICTURE GENERATOR PHOTODETECTOR

BACKGROUND OF THE INVENTION

The present invention relates to a video picture generator detector of the charge transfer solid camera type operating by frame transfer. According to an envisaged application, the invention is particularly suitable for equipping a television homing apparatus, called TV homing.

In such a device, the received radiation is focused by an optical lens onto the actual detector means or sensor. The detected video signal is then processed in electronic circuits, which are a function of the intended use. The photodetector can be incorporated into a system used on the ground or into an airborne system in order to obtain an angular localization of the target, a display of the television picture or automatic tracking of the target on the basis of the angular localization or by video contrast, etc.

CTD sensors operating by frame transfer have the photodetector elements arranged in the form of an array. They are frequently constructed with CCD circuits. These sensors have a high, but stantially constant sensitivity, i.e. the variation range of the light flux trapped by the detector must remain relatively limited to obtain a satisfactory operation corresponding to a substantially linear response. Under these conditions, the detected signal has an average value corresponding to the optimum operating value provided by the manufacturer and saturation risks are eliminated.

In order to ensure automatic operation by day satisfying a solid TV camera with a CTD sensor, it is necessary to reach dynamic ranges of $10^3$ to $10^4$, the dynamic range being defined by the ratio of the maximum illumination of the scene to the minimum overall illumination. It is therefore necessary to considerably increase the light flux variation range admissible by the detector without any risk of saturation for the latter, i.e. by acting on the sensitivity to observe a video signal of substantially constant average level. It is not possible to bring about a sensitivity variation by electronic control, as is the case in practice for a conventional vidicon arrangement.

One solution which can be envisaged is the introduction of a diaphragm into the focusing optics, but the resulting rise in the dynamic range is still very limited. Moreover, for placing a TV camera with a CTD sensor within a missile homing, it is not desirable to have to provide a motorized diaphragm arrangement with respect to the optics in view of the fact that integration is made more difficult on a gyroscopic structure, a more difficult practicability and a more severe requirement imposed with regard to compactness and reliability.

BRIEF SUMMARY OF THE INVENTION

One object of the present invention is to obviate these disadvantages by providing a device in which the video signal detected by the CTD sensor is automatically kept substantially constant when the average illumination on the observed scene varies significantly.

Another object of the invention is to provide a device which is particularly suitable for integration into a gyroscopic structure of a TV homing equiping a missile.

According to a feature of the invention, a frame transfer TCD solid camera is provided comprising sensitivity regulating means grouping on the one hand means for controlling the video signal by varying the integration time and on the other optical attenuation means for substantially producing a chopping of the image area of the CTD array sensor, said chopping being produced synchronously with the time interval during which the collected charges are transferred, said optical attenuation means incorporating at least two planar disks coaxial with the axis of the focusing optics, which face and are in the vicinity of one another, one disk being fixed and the other rotating about an axis at an angular velocity synchronous with the frame frequency.

BRIEF DESCRIPTION OF THE DRAWINGS

The invention is described in greater detail hereinafter relative to non-limitative embodiments and the attached drawings, wherein show:

FIG. 1 a general diagram of a photodetector according to the invention.

FIGS. 2a to 2d the signals relating to the operation of the photodetector of FIG. 1.

FIGS. 3a to 3f, diagrams showing the variation of the relative positioning between two attenuating disks producing a periodic chopping.

FIGS. 4 and 5 diagrams of a first constructional variant of the attenuating disks.

FIGS. 6 and 7a to 7d a diagram of a second constructional variant of the attenuating disks and corresponding density variation curves.

FIG. 8 a diagram of an embodiment of the photodetector showing in greater detail the sensitivity regulating means.

FIGS. 9 and 10 a diagram of a partial circuit for the embodiment of FIG. 8 and corresponding waveforms.

FIG. 11 a simplified diagram of a variant of the photodetector using polarizing disks.

FIG. 12 curves relating to the attenuation variation resulting from the arrangement according to FIG. 11.

FIG. 13 a diagram relating to an application of the photodetector to a TV homing.

DETAILED DESCRIPTION OF THE PREFERRED EMBODIMENTS

With reference to the general diagram of FIG. 1, the photodetector comprises an optical receiver 1 which focuses the receiving radiation on a light-sensitive mosaic of CTD circuits forming detector 2. The detected video frequency signal SV is transmitted to additional operating circuits 3. Signal SV corresponds to a line-by-line scanning of the television-type picture, Block 4 represents the synchronization means processing the signals necessary for the transfer and scanning of the picture.

According to the invention, this structure is such that it permits a regulation of the detector sensitivity authorizing operation in a wide variation range of the average illumination of the observed scene. The regulating means comprise on the one hand a control device 5 acting as a function of the value of video signal SV and on the integration time parameter during which the photons trapped by the sensor are converted into electrical charges and on the other hand an optical attenuator arrangement for producing a substantially total periodic shutter effect of the receiving optics during each charge transfer interval. The attenuator arrangement comprises two planar disks coaxial in accordance with axis Z of the receiving optics, a first disk 6 being fixed and a second disk 7 rotates about axis Z at an angular velocity which is synchronous with the frame frequency of the picture scanning. The disks are shown spaced from one another in order to clarify the representation, but it is obvious that they face one another in very close proximity. The desired synchronism is ensured by means controlling the rotation of movable disk 7. This control is symbolized by circuits 8 which carry out phase comparison, a position sensing device 9, a motor unit 10 and a drive mechanism 11.

To provide a better understanding of the invention and to more clearly show the process used, the known operation of a frame transfer CTD sensor is briefly described hereinafter.

The silicon surface has three portions. On the integration surface or light-sensitive portion 21 is formed the optical image of the scene observed. This surface is formed by a mosaic of elements grouping for example 256 lines of 320 photo-elements, each of which converts the light which it receives into an electron charge. There are in fact three interlaced groups of 256 lines of 320 elements. Each group respectively receives the timing signals V1, V2, V3 making it possible to perform a pseudo-interlacing as a result of the permutation of the polarization of the two groups of lines on two successive frames and the vertical transfer of the accumulated charges for frame blanking period T1 (FIG. 2c). A second portion 22 or buffer store surface substantially identical to the first surface serves to receive the charges from surface 21. Vertical charge transfer is produced by applying timing signals VA1, VA2, VA3, which also serve to bring about a line-by-line parallel transfer from store 22 to register 23 for the duration T2 (FIG. 2a) of the following frame. The third portion is constituted by register 23 and the video output stage 24. In the present embodiment, the register has three groups of 320 cells, each group receiving a common clock respectively $\phi H1$, $\phi H2$, $\phi H3$ at the dot frequency for performing a line-by-line series sequential reading of the store charges.

The amplitude of the signals supplied by the detector is a function of the illumination received by the photosensitive surface. If the illumination is too great, a saturation phenomenon occurs when the potential troughs created beneath the electrodes are filled by the released photoelectrons, this saturation leads to a limitation of the amplitude of the video-frequency signal. If, however, the illumination is too low, the signal/noise ratio deteriorates and rapidly becomes very low making the signal supplied unusable.

The photodetector according to the invention has means for the automatic regulation of the sensitivity in order to enable the sensor to operate under optimum conditions, i.e. slightly below saturation. The number of electrons collected is a function of the surface reached by the light beams, the lighting intensity and the time during which they can be collected. According to the invention, the latter parameter called the integration time is varied.

For example, the nominal operating conditions of a CTD sensor giving it maximum sensitivity are integration time T2 of 19 ms for a transfer time T1 to the store of 1 ms, i.e. during 95% of the period of frame T3 (FIGS. 2a and c).

Thus, the photodetector acts by reducing the sensitivity whilst reducing the integration time T1, as shown for example in FIG. 2b. The maximum value of T1 is T2=T3−T1 when assuming that the frame period T3 and the transfer time T1 are constant (FIG. 2c).

A limit to this reduction is rapidly reached. Thus, during the charge transfer period T1 from the photosensitive portion 21 to the store portion 22, these cells continue to integrate the charges on receiving light and, as shown in FIG. 1, where a considered part of the scanned image consists of a white square b on a black background a. The charges of part a will collect other parasitic charges on passing in front of the superimposed square b. As a result, when transfer is at an end, the stored part a will appear grey instead of black in the manner of a constant amplitude persistence proportional to the time during which the charges of part a pass in front of surface b and to the light intensity striking said surface. As it is not possible on the presently commercially available CTD sensors to reduce the transfer time, it is readily apparent that a reduction in the image quality will rapidly occur when it is desired to reduce the integration time to low values close to the transfer time, i.e. approximately 1 to 2 ms. In other words, the control device is only able to keep the above average video signal constant in the case of brightness ratios of approximately 10 to 20.

According to the invention, the sensitivity dynamic range is considerably increased by a synchronous chopping in front of the array, which eliminates or considerably reduces the illumination during the transfer period T1 of the image area to the store area so as to eliminate the aforementioned prejudicial effect.

It is then possible for the minimum integration times to assume very low values leading to dynamic ranges $10^3$ to $10^4$ which are adequate for ensuring the automatic operation by day of a TV camera with a CTD sensor.

The optical attenuation means can be constructed in the manner shown in FIG. 1 with two identical disks, disk 6 being fixed and disk 7 being rotated. Each disk has a transparent sector and an opaque sector, with respective centre angles of $\pi - \theta/2$ and $\pi + \theta/2$. The angular value $\theta$ is determined so as to correspond to the desired chopping time, i.e. time T1 by the rotation speed V given by $(2\pi/T3)t$.

FIG. 2d shows the variation in the overall transparency of the two disks between a minimum value Tm and a maximum value TM. The value Tm occurs during the chopping time T1 where the opaque part of the movable disk 7 completely hides the transparent area of fixed disk 6. The start and finish of this chopping phase are respectively shown in FIGS. 3a and 3b. The minimum value Tm is very low and corresponds to the residual light flux passing through the opaque layers or densities of disks 6 and 7. The maximum value TM is produced when the transparent sectors of disks 6 and 7 coincide (FIG. 3d). FIGS. 3c and 3e represent the intermediate positions and FIG. 3f a position very close to that at the start of chopping (FIG. 3a). For this so-called closure position, the common transparent area is reduced to an increasingly narrow slit which gives rise to diffraction. This leads to a modulation loss of the image during the short time preceding chopping. To obviate this disadvantage the shape of the opaque deposit 71 can be modified as shown in FIG. 4 for one of the disks 7 and in FIG. 5 for both disks. The shape is curved instead of being linear in the corresponding terminal part OM so as to prevent the formation of a narrow slit on closure. For example, the variation law of curve OM can be that of a spiral $R = K\theta$ with $K = 1/\tan\alpha$, i.e. the tangent at one point forms a constant angle $\alpha$ with the corresponding radius. On the basis of the variation law, the corresponding edges form between them a constant angle $2\alpha$ during chopping as indicated in FIG. 5. It is pointed out that the other edge of density 71 of disk 7 (or 61 of disk 6) can remain unchanged and constituted by radius ON (FIG. 4). The diffraction phenomenon caused on opening, i.e. during the short time following chopping (FIG. 3b) does not have a disturbing effect because it generally occurs outside the integration time T1 (FIG. 2b), except in the limit case T1=T2 (FIG. 2a). In the case of the disks shown in FIG. 5, the diffraction phenomenon on closing is significantly reduced, but for an overlapping value $\theta$ imposed by the transfer time T1, the maximum transmission TM is slightly less.

Another solution, which can also be combined with the aforementioned solution, consists of producing a density variation in the corresponding terminal part of the opaque area 71 in accordance with angular degraded attenuator methods. In the embodiment of FIG. 6, the opaque sector 71 of centre angle $\pi + \theta/4$ is extended by a sector 72 of angle $\theta/2$ where the density progressively decreases in accordance with a given law, e.g. linear, quadratic or the like. The density variation along an average circle (R) is e.g. of the type shown in FIG. 7a for a first disk and in FIG. 7b for a second disk. Curve 7c represents the overall density of the two disks at the end of chopping and FIG. 7d the overall density at the start of chopping (rotation by $\theta$ compared with FIG. 7c).

FIG. 8 is a diagram of a construction of a photodetector according to claim 1. Disks 6 and 7 are positioned very close to one another with the surfaces carrying the densities facing one another in such a way that the latter can be considered substantially coplanar over the axial optical path.

The rotation control means of disk 7 comprise the position sensor which can be constituted by a photoelectric cell 9 coupled to a light-emitting diode 30 directly fitted into a grooved axial portion of disk 6 and issuing into the opaque area of the latter. The signal FD detected by cell 9 is reshaped at 31 to obtain a fine pulse or pip during each revolution and is then applied to a phase comparator 32, which also receives the framed signal FT. The error signal from the comparator energises the drive motor 10 accordingly across a correcting filter 33 and an amplifier 34. This loop makes it possible to produce a position and phase control, i.e. of the speed. Phase comparator 32 can be designed in per se known manner in such a way that its output corresponds to a continuous level proportional to the phase difference of the instant signals when their frequency is equal, whilst a maximum or minimum level indicates that the frequencies are unequal, one being higher than the other and vice versa.

The means for controlling the video signal by regulating the integration time (circuit 5 in FIG. 1) comprise an integrating circuit 36 of video signal SV previously amplified in a circuit 35. Circuit 36 supplies the average video signal SVm which is compared in circuit 37 with threshold VR adjusted to the mean video reference value to be respected for the satisfactory operation of the sensor. The output $\epsilon$ of the threshold comparator 37 constitutes the error signal applied to a circuit 38 for regulating the integration time T1 by acting on signals V1, V2, V3 intended for the integration surface 21. Generator 4 supplies timing signals $\phi H1$ to $\phi H3$, VA1 to VA3 and signals $\phi V$ corresponding to signal V1 to V3 in the case of an integration time equal to value T2 (conventional operation of the CTD sensor).

The regulating circuit 38 is shown in FIG. 9 and FIG. 10 shows the signals relative to its operation. The error signal $\epsilon$ is added to a d.c. component V in such a way that the corresponding result is still positive and is applied to the operational amplifier 43. The amplified signal is converted into digital form in the analog-digital conversion circuit 44 to form a word having an adequate number of bits, e.g. 9 bits in order to be able to count at least 288 lines. This digital information prepositions a digital counter 45 which counts clock FL corresponding to the line frequency. When the counter reaches the end of the count, it supplies a pulse signal S1 which is transmitted to the clock input CK of a type JK flip-flop 46 and which switches over the latter. Flip-flop 46 and counter 45 are reset by the pulse following the frame signal FT. The flip-flop output Q supplies pulse S2, whose duration corresponds to the integration time T1. Signal S2 controls the closing of analog gates 47 so as to permit the passage for pulse time T1 of the signal $\phi V$ forming signals V1, V2 and V3 applied to the integrating part 21 of the CTD sensor. One of the three signals $\phi V$ is at positive voltage, e.g. 10V, whilst the two others are at 0V. For the frame under consideration, it is the signal corresponding to V1 which is at 10V. Before closing gates 47, outputs V1 and V3 are all at 0V and no charge integration takes place at the sensitive surface 21 of the sensor. As from the end of the count, which is dependent on the mean video value, gates 47 are closed and signal V1 passes to 10V which authorizes integration. As from the end of the field during transfer time T2, the conventional signals $\phi V$ are produced and have to be transmitted to carry out the line-by-line transfer into store 22. Gates 47 are kept closed for time T1 by an OR gate 48 interposed on the control connection S2 and which receives the pulse FT by a second input. After transfer, a new frame cycle starts, gates 47 are open again and outputs V1 to V3 at 0V until the end of the following count and so on.

The attenuating disks can be produced other than with the densities, as described hereinbefore. Another way to produce the desired optical attenuation consists of using disks made from materials of the polarizer type. Once again, two disks can be used, one being fixed and the other movable. This leads to the advantage that there is no longer any need to position the disks close to one another and substantially in a pupil plane and instead they can be positioned in a random manner over the axial optical path. In particular, the disks need only be of small size if they are positioned close to the sensor and consequently close to the focal image plane. However, attenuation is high and chopping is less effective than with the arrangements described hereinbefore, which is due to the sinusoidal variation law of the transmission during one revolution. This law is represented in L1 for two polarizing disks in FIG. 12. It is pointed out that the transmission variation period is produced during half a rotation and consequently the movable disk must be moved at a speed which is twice as low with an adjustment of the positions which are such that the transfer time T1 remains well centered on the position corresponding to minimum transmission Tm. Thus, the dynamic range which can be electronically obtained on the CTD sensor is smaller than with the variable transparency arrangement. With two polarizers, it is possible to obtain $TM \approx 0.1$ and $Tm \approx 0.0005$ and a dynamic range of approximately 280. To increase the dynamic range, a third polarizing disk is used and the arrangement has, in the manner shown in FIG. 11, two fixed disks 6a, 6b and movable disk 7 with its driving means symbolized by block 12. The fixed disks are oriented with parallel polarization axes. The attenuation law shown at L2 in FIG. 12 has wider minima and maxima, value TM being approximately half that in the case of two polarizers. The value Tm is also much lower and the dynamic range obtained is well above 1500. It is pointed out that the dynamic range increases very rapidly for an arrangement using polarizers if it is possible to reduce the image/store transfer time of the sensor, e.g. with only two disks and if time T1 drops from 1 ms to 0.2 ms the dynamic range increases from 280 to 1900.

Within the scope of an application to a television homing apparatus with a CTD sensor, the photodetector of FIG. 1 can be brought into the form shown in FIG. 13. The optical lens is a Cassegrain-type system with a main mirror 50, a secondary mirror 51 and a correcting optics 52 preceding detector 2. The Cassegrain optical system, detector 2 and disks 6 and 7 are gimbal-suspended in accordance with a free gyroscopic system with an external top. The suspension with two degrees of freedom is identifiable by a forced frame 53 fixed to the outer body 54, it being possible for an annular central portion 55 to rotate about the reference axis Yo and a second frame 56 can rotate about an axis X perpendicular to Yo and to the optical axis Z or gyroscope axis. The gyroscopic mass or top 57 is rotated about axis Z and moves movable disk 7. Disks 6 and 7 are positioned in the vicinity of the main mirror 50. Disk 6 is fixed to the said mirror, whilst disk 6 is mechanically coupled by its periphery to top 57. The gyroscope is shown with its axis Z directed in accordance with the reference position Zo corresponding to the longitudinal axis of the missile (zero pointing angle, axis X perpendicular to the plane of the drawing).

In this sectional view according to Zo Yo it is also possible to see a transparent terminal radome 58 and a cooling device 59 for keeping detector 2 at a low temperature. The top may comprise a magnet or may have coil systems 60. The so-called precesion coils 62 are fixed to support 63 integral with the missile body 54. Top 57 is disconnected from the detector and optical system by a ball bearing 64 and rotates disk 7. Secondary mirror 51 is supported by mechanical means 65, which can consist of a system of arms, e.g. made from a plastics material. The cylindrical members 66, 67, 68 serve as mechanical supporting means for optics 50, 51, 52 and the detector system 2-59 and for coupling said elements to the second frame 56.

It is pointed out that the free gyroscopic device does not necessarily imply a gimbal-suspension with external top, an arrangement with an internal top is also possible. In exemplified manner, the optics can comprise a fixed input lens integral with the frame and a convex mirror integral with the top and which reflects the radiation towards the detector located in the central grooved part of the input optics. This arrangement is particularly suitable for the use of small polarizing disks.

Numerous variants are possible to the embodiments of the invention described hereinbefore which has served to illustrate the advantages resulting from the use thereof in any system having a high sensitivity detector of the frame transfer CTD sensor type and in particular television homing apparatus.

What is claimed is:

1. A video picture generator photodetector using a solid state camera with charge transfer operating by vertical frame transfer and comprising: an optical system for focusing the radiation onto the image area of a charge transfer array detector; a generator for the synchronization signals of the detector; and means for regulating the detector sensitivity grouping means for the control of the video signal by varying the integration time during which the electrons are collected in the picture area and optical attenuation means using density-carrying disks for chopping the picture area during each frame period substantially during the time interval when the collected charges are transferred to the store area of the detector.

2. A photodetector according to claim 1, wherein the optical attenuation means comprise at least two identical, planar disks coaxial to the axis of the optical system and drive means for producing a relative rotation of the disks about the axis at an angular velocity which is synchronous with the frame frequency.

3. A photodetector according to claim 2, wherein it comprises a first fixed disk and a second movable disk moved by drive means.

4. A photodetector according to claim 3, wherein the disks are made from a transparent material with a density deposited on one face in accordance with a sector of centre angle $\pi + \theta/2$, the angle $\theta$ being determined so as to produce the desired chopping period, the faces carrying the densities fixing one another substantially level with the optical pupils.

5. A photodetector according to claim 4, wherein one of the radial edges of the deposit is curved, so as to prevent a diffraction effect at the end of integration corresponding to the initial charge transfer time.

6. A photodetector according to claim 4 or 5, wherein the deposit has a supplementary sector with a variable density forming an annular degraded attenuator.

7. A photodetector according to claim 3, wherein the disks are made from a polarizing material and the rotation speed is synchronous with the frame half-frequency.

8. A photodetector according to claim 7, wherein it has a third fixed polarizing disk oriented in such a way that its polarization axis is parallel to that of the first fixed disk.

9. A photodetector according to claim 4 or 8, wherein the drive means are formed by a phase loop for the position and speed control of the movable disk, the loop having in series a phase comparator for comparing the rotation frequency to that of the frame, a filter circuit and an amplifier for energising a motor means.

10. A photodetector according to claim 1 or 8, wherein the video control means comprise in series a circuit for integrating the detected video signal supplying the mean video value, a threshold comparator for comparing said mean value with a reference value and a circuit which regulates the integration time modifying said duration as a function of the threshold comparator output by acting on corresponding synchronization signals of the detector, said regulating circuit successively comprising an analog/digital conversion circuit of the comparator output signal, a counting circuit at the line frequency of the digital comparison information, a flip-flop controlled by the counter output and which controls the analog gates inserted in the corresponding synchronization connections.

11. A photodetector according to claim 9, wherein the focusing optics, detector and optical attenuation means are mounted on a gyroscope having an external top which drives the said second movable disk, the lens being a Cassegrain arrangement with the primary reflector integral with the first fixed disk.

* * * * *